US008885932B2

(12) United States Patent
Miyazaki et al.

(10) Patent No.: US 8,885,932 B2
(45) Date of Patent: Nov. 11, 2014

(54) IMAGE PROCESSING APPARATUS AND PROFILE GENERATION METHOD

(75) Inventors: Shinichi Miyazaki, Kawasaki (JP); Mayuko Kishino, Tokyo (JP); Toshiki Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 64 days.

(21) Appl. No.: 13/358,474

(22) Filed: Jan. 25, 2012

(65) Prior Publication Data

US 2012/0195498 A1 Aug. 2, 2012

(30) Foreign Application Priority Data

Feb. 1, 2011 (JP) ................................ 2011-020094

(51) Int. Cl.
*G06K 9/00* (2006.01)
*H04N 1/60* (2006.01)

(52) U.S. Cl.
CPC ............ *H04N 1/603* (2013.01); *H04N 1/6058* (2013.01)
USPC ........................................................ 382/162

(58) Field of Classification Search
None
See application file for complete search history.

(56) References Cited

U.S. PATENT DOCUMENTS

| | | | | |
|---|---|---|---|---|
| 4,758,885 | A * | 7/1988 | Sasaki et al. | 358/520 |
| 5,363,218 | A * | 11/1994 | Hoshino | 358/518 |
| 6,437,792 | B1 * | 8/2002 | Ito et al. | 345/600 |
| 6,618,499 | B1 * | 9/2003 | Kohler et al. | 382/162 |
| 6,775,028 | B1 * | 8/2004 | Reel | 358/1.9 |
| 6,882,445 | B1 * | 4/2005 | Takahashi et al. | 358/1.9 |
| 7,006,105 | B2 * | 2/2006 | Deishi et al. | 345/590 |
| 7,167,277 | B2 * | 1/2007 | Shimizu et al. | 358/1.9 |
| 7,463,386 | B2 * | 12/2008 | Misumi | 358/1.9 |
| 8,139,274 | B2 * | 3/2012 | Kang et al. | 358/520 |
| 8,427,696 | B2 * | 4/2013 | Suzuki | 358/1.9 |
| 2004/0056867 | A1 * | 3/2004 | Cui et al. | 345/590 |
| 2004/0061881 | A1 * | 4/2004 | Shimizu et al. | 358/1.9 |
| 2005/0094169 | A1 * | 5/2005 | Berns et al. | 358/1.9 |
| 2005/0219585 | A1 * | 10/2005 | Suzuki et al. | 358/1.9 |
| 2005/0219586 | A1 * | 10/2005 | Suzuki et al. | 358/1.9 |
| 2006/0274340 | A1 * | 12/2006 | Yamazoe | 358/1.9 |

(Continued)

FOREIGN PATENT DOCUMENTS

JP 2007-274584 10/2007

OTHER PUBLICATIONS

U.S. Appl. No. 13/370,237, filed Feb. 9, 2012 by Mayuko Kishino, et al.

*Primary Examiner* — Bhavesh Mehta
*Assistant Examiner* — Feng Niu
(74) *Attorney, Agent, or Firm* — Fitzpatrick, Cella, Harper & Scinto

(57) ABSTRACT

When a grid point that is the object to be mapped is present in a first division region a color of which has lightness equal to or higher than the lightness at the maximum chroma point in the color gamut and has chroma higher than the chroma at that point, the intersection of a straight line connecting the grid point to the maximum chroma point and an achromatic axis is calculated and a point having lightness equal to or higher than the lightness of the intersection is set as the focal color. Then, the intersection of a straight line connecting the object grid point to the focal color and the boundary of color gamut is set as an output color for the grid point. The output colors are prevented from being separated into color on the high and on the low lightness sides with respect to the maximum chroma point.

14 Claims, 9 Drawing Sheets

(56) References Cited

U.S. PATENT DOCUMENTS

2007/0003136 A1* 1/2007 Shimbaru .................... 382/167
2007/0097389 A1* 5/2007 Morovic ....................... 358/1.9
2007/0229867 A1 10/2007 Suzuki .......................... 358/1.9
2007/0291312 A1* 12/2007 Kaneko et al. ................ 358/2.1
2007/0296988 A1* 12/2007 Tsuji ............................. 358/1.9
2008/0007784 A1* 1/2008 Tsuji ............................. 358/2.1
2009/0284774 A1* 11/2009 Kishimoto .................... 358/1.9
2011/0116137 A1 5/2011 Uratani et al. .............. 358/3.23

* cited by examiner

IMAGE PROCESSING APPARATUS AND PROFILE GENERATION METHOD

BACKGROUND OF THE INVENTION

1. Field of the Invention

The present invention relates to an image processing apparatus and a profile generation method. More specifically, the invention relates to gamut mapping in which color gamut of an input device is converted into a color gamut of an output device.

2. Description of the Related Art

In the so-called color management system (CMS) or the like for realizing a color reproduction technology that does not depend on a device between input-output devices, a gamut mapping technology that absorbs a difference in color reproduction range between the input-output devices is used. Conventionally, as one method of gamut mapping, an algorithm of mapping to a point on an auxiliary line that is drawn to one point fixed on a lightness axis (for example, L*=50, a color represented by this point is hereinafter referred to as a focal color) is known.

Japanese Patent Laid-Open No. 2007-274584 discloses an example of gamut mapping using a focal color. Japanese Patent Laid-Open No. 2007-274584 discloses that, when an input image is mapped to an output color gamut by a colorimetric method, the moving range of a focal color is controlled according to the characteristic of mapping such as mapping performed with the emphasis on chroma, mapping performed with the emphasis on lightness and the like, and that furthermore, the focal color is made to be differentiated according to the lightness of an input value.

FIGS. 1A and 1B are diagrams showing a standard color space as a plane specified by a lightness (L*) axis and a chroma (C*) axis in a certain hue in the standard color space. These diagrams illustrate: the range (an upper limit value L_max and a lower limit value L_min) of a focal color fixed on an L axis set under conditions of chroma emphasis and lightness emphasis respectively, with respect to data Pin of a grid point having a lightness defined in the standard color space; and the results obtained by performing the mapping of the data Pin toward the focus within the respective ranges, with a method disclosed in Japanese Patent Laid-Open No. 2007-274584. The focal color is calculated by formula (1) below that adaptively sets the focal color according to the lightness of the grid point. In this formula, L(S) represents the lightness value of the focal color, L_in represents the lightness value of data on the grid point, Lt represents the highest lightness value in an input space and Lb represents the lowest lightness value in the input space.

$$L(S)=(L\_max-L\_min)\cdot L\_in/(Lt-Lb)+L1\_min \quad (1)$$

In a conventional method, the focal color (Ls, 0, 0) on an achromatic axis (L axis) moves between L_min and L_max, according to the lightness L_in of the input point. According to formula (1), in the case that the difference between L_min and L_max is small, the focal color moves in a narrow range on the achromatic axis, and mapping with the emphasis on chroma is achieved as shown in FIG. 1A. On the other hand, in the case that the difference between L_min and L_max is large, the focal color moves in a broad range on the achromatic axis, and mapping with the emphasis on lightness is achieved as shown in FIG. 1B. Thus, it is possible to select the characteristic of mapping such as mapping with the emphasis on chroma, mapping with the emphasis on lightness and the like and reflect the requirement of a user on the characteristic of mapping.

However, in the mapping using the focal color as disclosed in Japanese Patent Laid-Open No. 2007-274584, a large change of lightness that is called "lightness jumping" may occur depending on the shape of the color gamut of an output device, and consequently, the impression on a color reproduced in an input device disadvantageously appears to be different from that on a color reproduced in the output device.

FIG. 2 is a diagram illustrating this problem, and shows an example where, in a standard color space 301, colors in a color gamut 300 of an input device is mapped using a focal color Q to a color gamut 302 of a printer that is an output device. As shown in FIG. 2, in the mapping using the focal color Q, colors P1in, P2 in and P3 in defined in the standard color space 301 and having the same lightness in the color gamut 300 of the input device are mapped to colors P1out, P2out and P3out, respectively, in the color gamut of the output device. More specifically, the color P1in in the color gamut 300 of the input device, which also exists within the color gamut 302 of the output device, is mapped to the color as it is. On the other hand, the colors P2in and P3in in the color gamut 300 of the input device, which exist outside the color gamut 302 of the output device, are compressed to be points on the surface of the color gamut 302, which are points on straight lines drawn to the focal color Q from the respective colors, by the mapping, respectively. Then, between the colors P2out and P3out resulting from such compression, a large lightness difference occurs. Specifically, the colors P2out and P3out are respectively mapped to the higher lightness side and to the lower lightness side with respect to the color C having the maximum chroma in the color gamut 302 of the output device, and consequently, even if the colors have the same lightness in the color gamut 300 of the input device, the colors are mapped to colors that highly differ from each other in lightness in the color gamut 302 of the output device. When such large lightness difference occurs, the impression on the color reproduced in the input device appears to be different from that on the color reproduced in the output device.

In Japanese Patent Laid-Open No. 2007-274584, since the mapping described above and using the focal color is performed, the lightness jumping described above may occur depending on the shape of the color gamut of the output device.

SUMMARY OF THE INVENTION

The present invention is made to solve the foregoing problem; an object of the present invention is to provide an image processing apparatus and a profile generation method that prevent, when gamut mapping is performed, lightness jumping regardless of the shape of the color gamut of an input device and that can perform satisfactory color reproduction.

In a first aspect of the present invention, there is provided an image processing apparatus that generates a profile for, in a color space, converting a color of a grid point defined in a first color gamut into a color in a second color gamut by mapping the color of the grid point to a color on a straight line connecting the color of the grid point to a focal color on achromatic axis, the apparatus comprising: a determining unit configured to determine to which one of a first division region, a color in which has lightness higher than the lightness at a maximum chroma point in the second color gamut and has chroma higher than the chroma at the maximum chroma point, and a second division region other than the first division region, in a plane of a hue of the color of the grid point, the color of the grid point belongs; a converting unit configured to perform mapping the color of the grid point defined in the first color gamut, according to the determined region to convert the color of the grid point into a color in the second color gamut; and a profile generation unit configured to generate the profile based on a result of the conversion of each of a plurality of the color of the grid point, wherein the converting unit sets a color having lightness equal to or higher than lightness at a intersection point of a straight line connecting the color of the grid point to the maximum chroma point and an achromatic axis as a focal color, and performs the mapping the color of the grid point, in a case that the color of the present belongs to the first division region.

In a second aspect of the present invention, there is provided a profile generation method for generating a profile for, in a color space, converting a color of a grid point defined in a first color gamut into a color in a second color gamut by mapping the color of the grid point to a color on a straight line connecting the color of the grid point to a focal color on achromatic axis, the method comprising: a determining step of determining to which one of a first division region, a color in which has lightness higher than the lightness at a maximum chroma point in the second color gamut and has chroma higher than the chroma at the maximum chroma point, and a second division region other than the first division region, in a plane of a hue of the color of the grid point, the color of the grid point belongs; a converting step of performing mapping the color of the grid point defined in the first color gamut, according to the determined region to convert the color of the grid point into a color in the second color gamut; and a profile generation step of generating the profile based on a result of the conversion of each of a plurality of the color of the grid point, wherein the converting step sets a color having lightness equal to or higher than lightness at a intersection point of a straight line connecting the color of the grid point to the maximum chroma point and an achromatic axis as a focal color, and performs the mapping the color of the grid point, in a case that the color of the present belongs to the first division region.

According to the configuration described above, whether or not the color of the grid point to be mapped is present in the first division region where, in the plane of the hue of the color of the grid point, the color has a lightness higher than the lightness of the maximum chroma point in the second color gamut that is for example a color gamut of the output device and has a chroma higher than the chroma of the maximum chroma point is determined. Then, when the color of the grid point is present in the first division region, the focal color is set at a position that has a lightness equal to or higher than the lightness of the intersection of the straight line connecting the color of the grid point to the maximum chroma point and the achromatic axis, and the color of the grid point is mapped. In this way, it is possible to prevent the separation of the output color corresponding to the grid point into a color on the higher lightness side and a color on the lower lightness side with respect to the maximum chroma in the second color gamut, that is, the occurrence of significant difference in lightness.

Further features of the present invention will become apparent from the following description of exemplary embodiments (with reference to the attached drawings).

DESCRIPTION OF THE EMBODIMENTS

Embodiments of the present invention will be described in detail below with reference to accompanying drawings.

First Embodiment

The first embodiment of the present invention relates to an apparatus and a method that generate a profile for mapping, in a standard color space, the color gamut of an input device to the color gamut of an output device.

(Configuration of Image Processing Apparatus)

Figures 1A, 1B:
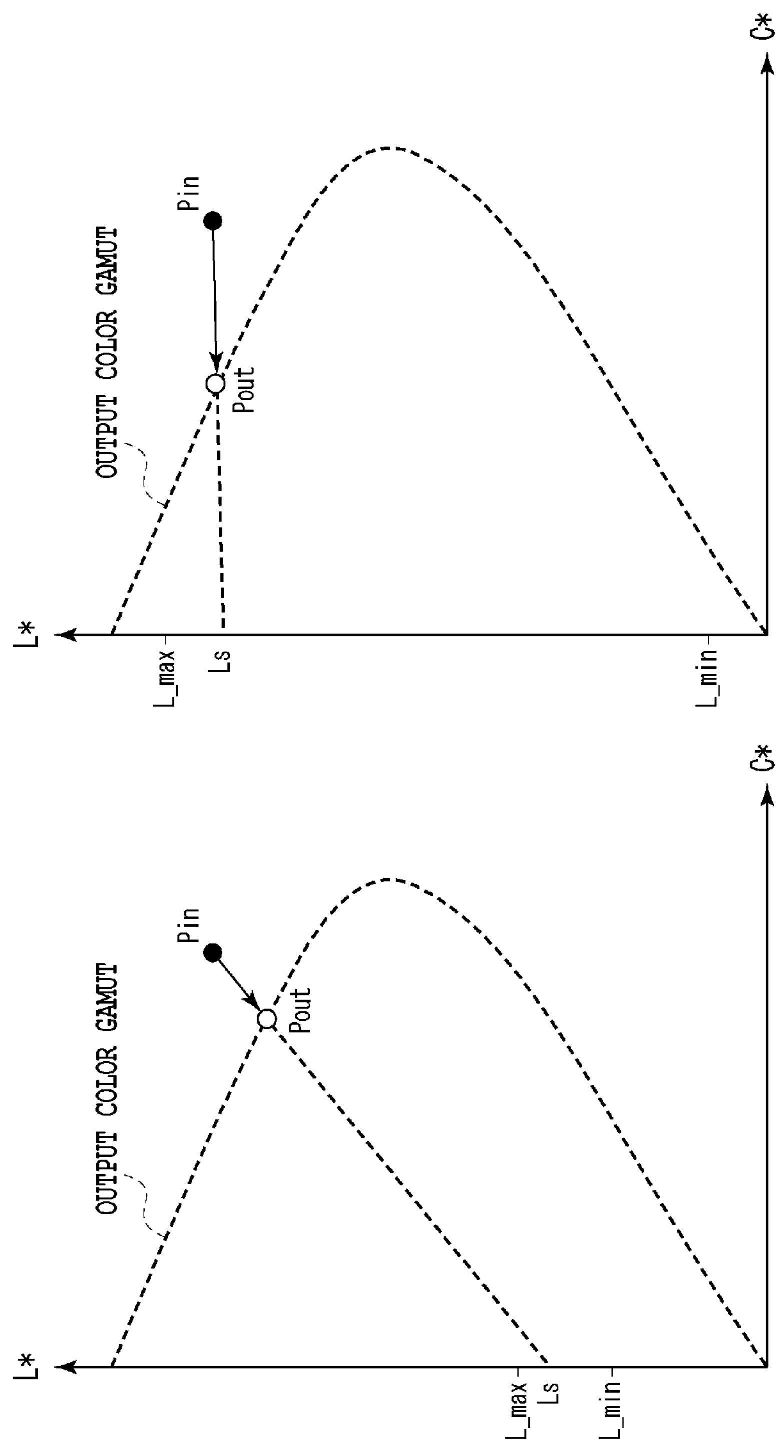
FIGS. 1A and 1B are diagrams illustrating a method of performing conventional gamut mapping with chroma emphasis and lightness emphasis.
Figure 2:
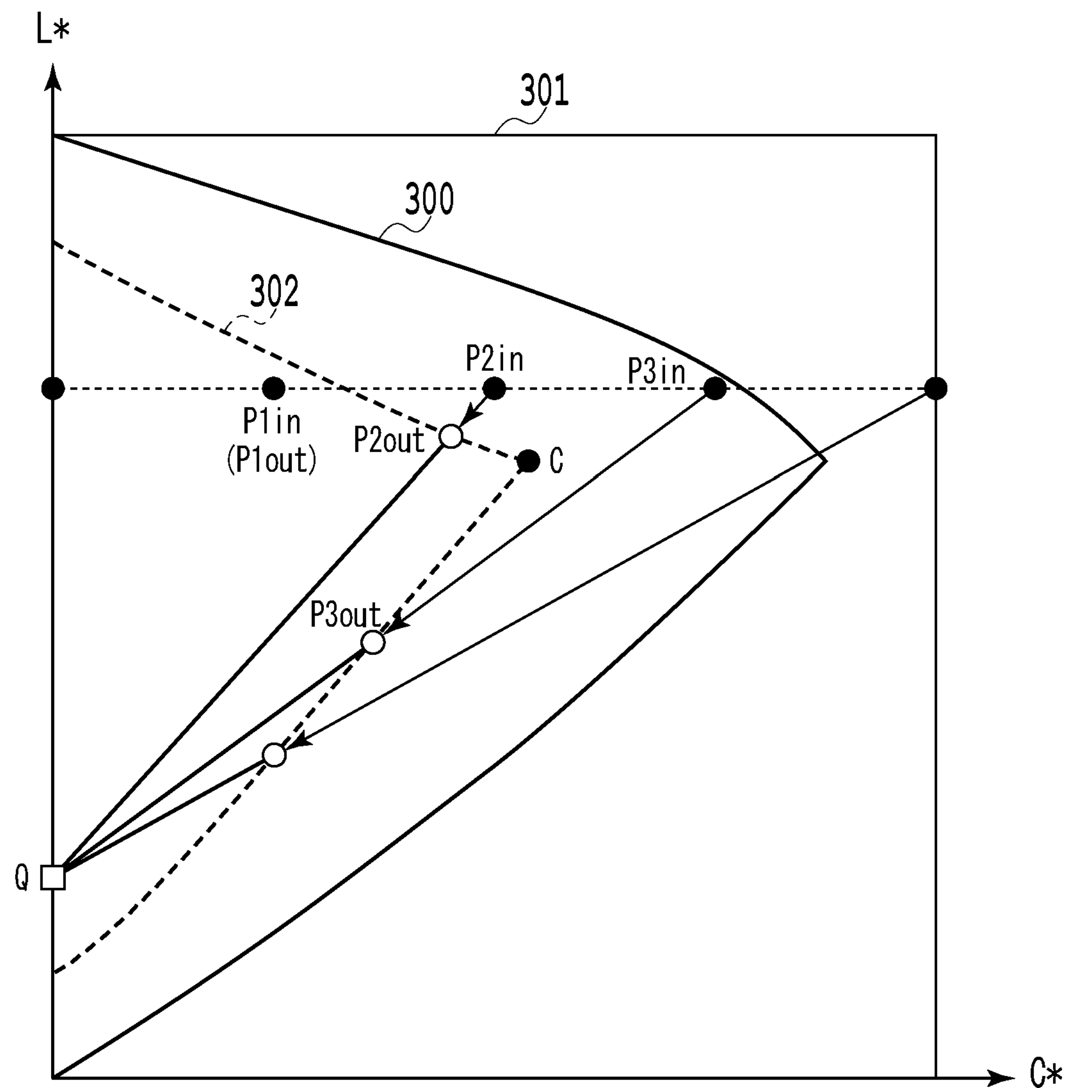
FIG. 2 is a diagram illustrating an example where lightness jumping occurs in the conventional gamut mapping.
Figure 3:
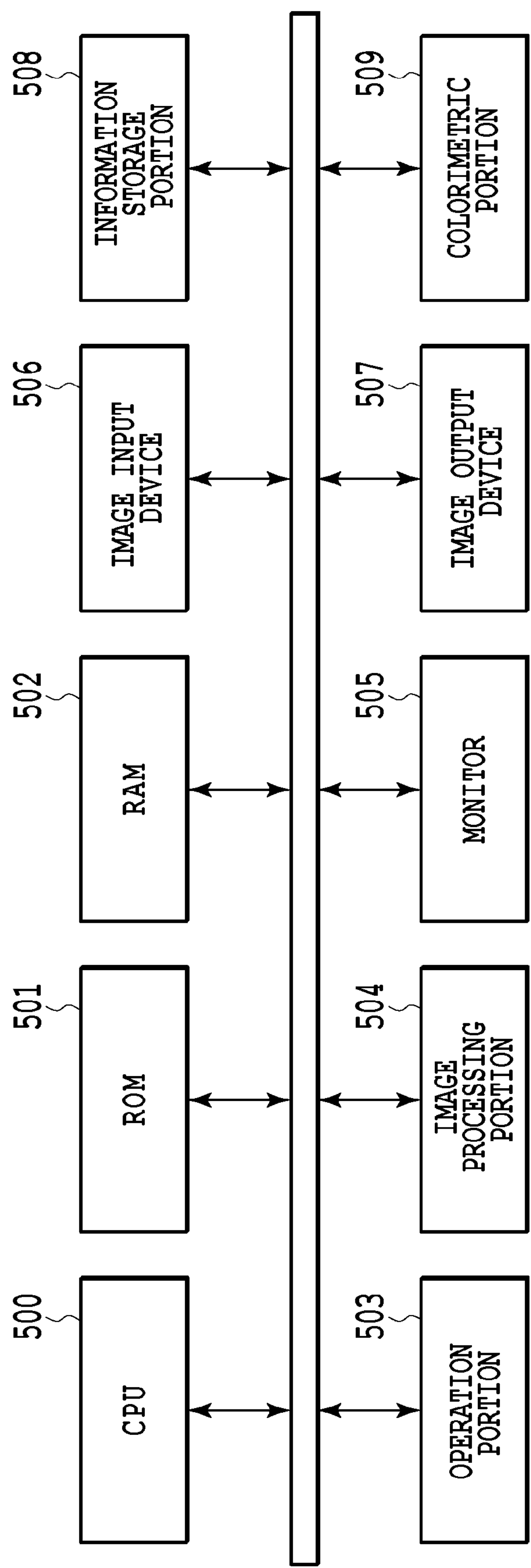
FIG. 3 is a block diagram showing the configuration of an image processing apparatus according to an embodiment of the present invention.

FIG. 3 is a block diagram showing the configuration of an image processing apparatus according to the present embodiment. The image processing apparatus of the present embodiment is realized through the execution of a program by a host computer. In FIG. 3, a CPU 500 performs, according to information data and various programs stored in a ROM 501, various types of control on a RAM 502, an operation portion 503, an image processing portion 504, a monitor 505, an image input device 506 and an image output device 507. Examples of the programs stored in the ROM 501 include a control program, an OS (operating system), an application program, a color conversion processing module and a device driver. An information storage portion 508 is formed with a hard disk or a nonvolatile memory, and is a storage portion that stores and reads information and data described later. A colorimetric portion 509 measures the color of a patch chart printed by the image output device 507 so as to acquire information necessary to generate an output color reproduction region and a profile. Although, in the present embodiment, the color measurement is performed through the control by the CPU 500 and colorimetric information is stored in the information storage portion 508, a colorimetric device provided in the image output device 507 may perform the measurement, and the colorimetric information may be stored in a predetermined storage portion of the image output device 507.

The image input device 506 is, for example, a digital camera or an image scanner, and forms an input portion of image data to be processed using a profile, which will be described later. The image output device 507 can be realized by a monitor, an inkjet printer, a thermal transfer printer, a dot printer or the like. In the present embodiment, the image output device 507 is in the form of an inkjet printing apparatus using six color inks that are cyan, light cyan, magenta, light magenta, yellow and black.

When the CPU 500 is operated, the RAM 502 can be utilized as a work area or a temporary save area of various control programs and data input from the operation portion 503. The operation portion 503 performs, based on an operation by the user, the setting of the image output device 507 and the input of data. The image processing portion 504 performs profile generation processing, which will be described later, and predetermined image processing such as color conversion processing using a profile. The monitor 505 can display the results of the processing performed by the image processing portion 504, data input by the operation portion 503 and the like.

The present invention is not limited to the form described above; a printing apparatus such as a printer may form a part or all of the image processing apparatus. For example, in a form in which an image shot by a digital camera is input directly to a printer where print output is performed, the image processing apparatus is formed in the printer, and thus it is possible to perform various types of processing described above. The profile generation processing, which will be described later, may be performed by a host computer that functions as the image processing apparatus described above; the generated profile can be stored in the host computer functioning as the image processing apparatus or a predetermined memory such as a memory of a printer and be used.

The color spaces used in the present embodiment are as follows. An input color space is an Adobe RGB space and a standard color space is a CIE-L*a*b* color space. The generated profile is a profile for conversion from the CIE-L*a*b* color space to the device RGB values of a printer. In the embodiments described below, an example of color measurement (colorimetric) processing is described as a method of performing color gamut mapping. In the colorimetric processing, the overlapping region of color gamut of the input and the output devices is expressed without being processed, and, with respect to a region that is not the overlapping region and that cannot be reproduced by the image output device 507, the color of the input device is mapped on the surface of an output color gamut.

Figure 4:
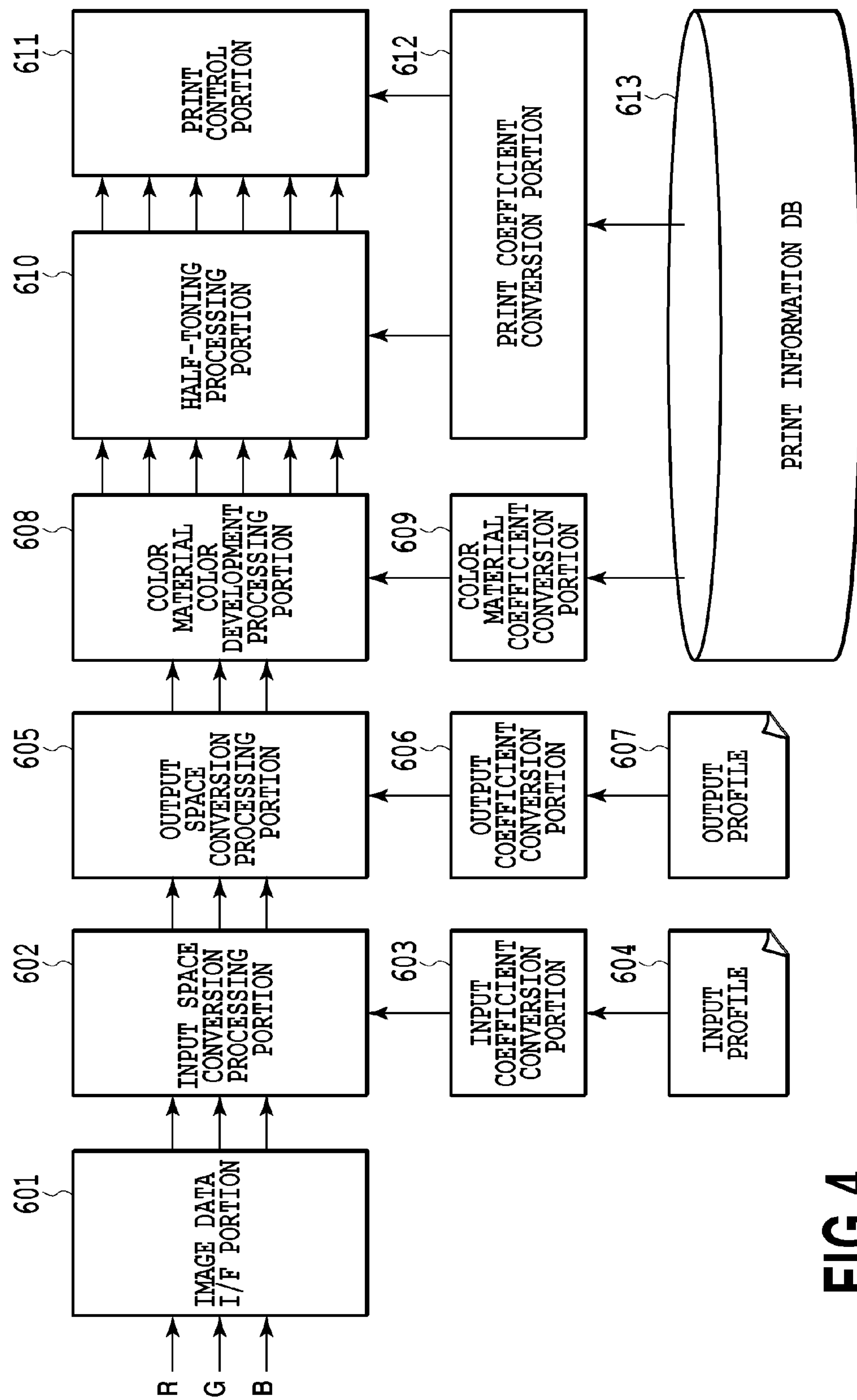
FIG. 4 is a block diagram showing the configuration of the image processing using a profile generated by processing in the embodiment of the present invention.

FIG. 4 is a block diagram showing the configuration for image processing using a profile generated by processing in the present embodiment, which will be described later. The image data to be printed is image data having color component signals of RGB. An image data I/F portion 601 receives this RGB image data. Then, an input space conversion processing portion 602 converts, according to its attribute, the RGB image data into image data (input image data) in a standard color space (L*a*b*, J*C*H* color space, sRGB, Adobe RGB or the like). In the present embodiment, as the standard color space, the L*a*b* color space is used. The input space conversion processing portion 602 performs the conversion processing with use of a three-dimensional look up table (LUT). Conversion parameters of the three-dimensional LUT are based on information on an input profile 604; an input coefficient conversion portion 603 converts the information on the input profile 604 into parameters for the input space conversion processing portion, and thus the conversion parameters are set.

An output space conversion processing portion 605 converts the input image data in the standard color space obtained through the processing performed by the input space conversion processing portion 602 into RGB image data (output image data) of device-dependent. This processing is also performed using the conversion parameters of the three-dimensional LUT. The processing parameters of the three-dimensional LUT are based on information on an output profile 607; the information on the output profile 607 is converted by an output coefficient conversion portion 606 into parameters for the output space conversion processing portion, and thus the processing parameters are set. The output profile 607 is a profile that is generated by processing which will be described later with reference to FIG. 6 and the subsequent figures.

The RGB image data of device-dependent obtained by the output space conversion processing portion 605 is developed (converted) by a color material color development processing portion 608 into image data of color component signals corresponding to color materials used in the image output device 507. This processing is also performed using the three-dimensional LUT. In the present embodiment, the RGB image data is converted into image data composed of color component signals on cyan, light cyan, magenta, light magenta, yellow and black. LUT parameters stored in a print information DB 613 are converted by a color material coefficient conversion portion 609, and thus the parameters used in the color material color development processing portion 608 are set. The print information DB 613 stores various parameters used for performing processing in the color material color development processing portion 608, a half-toning processing portion 610 and a print control portion 611. The various parameters will not be described; the type of print medium used in printing, the print mode and various parameter information corresponding to the purpose of printing are organized, selected as necessary and set. The data developed into the color material data is then converted into binary data by the half-toning processing portion 610. This processing can be performed by using a known quantization method such as an error diffusion processing method or a dither method. The print control portion 611 performs print control based on the obtained binary data according to a print pass number; here, a detailed description will not be given of it. The example that has been described above relates to the image processing based on the image data composed of the RGB signal components; naturally, the present invention is not limited to this example. For example, the present invention can equally be applied to a case where an image is output based on image data composed of CMYK signal components.

[Generation of the Profile]

A case where the present invention is applied to the generation of the output profile 607 shown in FIG. 4 will be described below. The CPU 500 shown in FIG. 3 performs the processing for generating the output profile by executing processing according to software that is stored in the ROM 501 and is used for generating profile parameters.

Figure 5B:
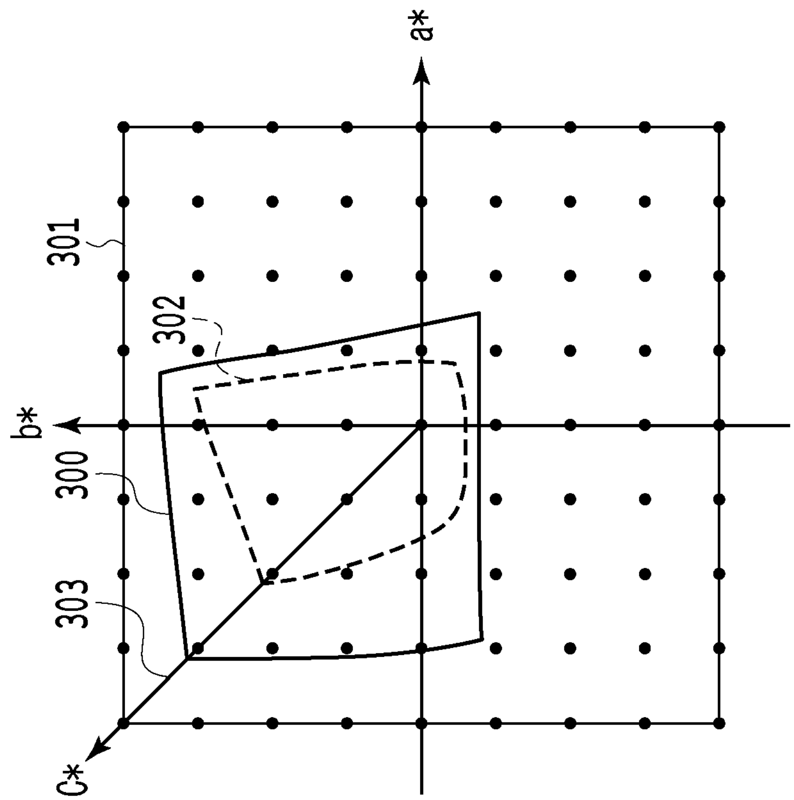
FIGS. 5A and 5B are diagrams illustrating a relationship between the mapping of the color gamut of an input device in a standard color space to the color gamut of an output device and a look up table that constitutes an output profile describing this mapping.
Figure 5A:
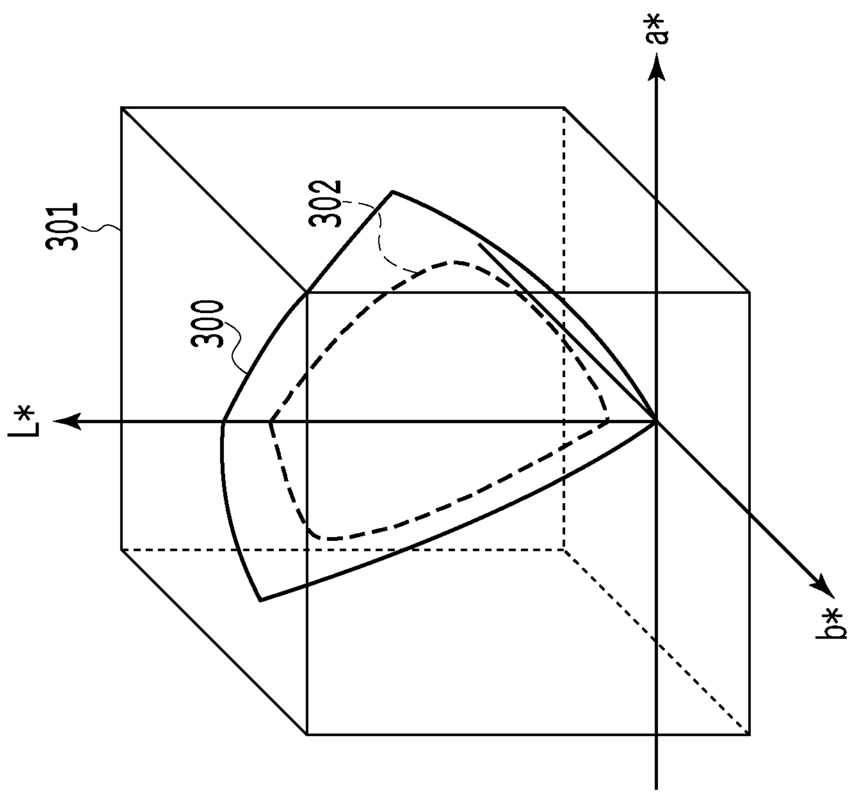

FIGS. 5A and 5B are diagrams illustrating a relationship between the mapping of a color gamut (a first color gamut) of the input device to a color gamut (a second color gamut) of the output device in the standard color space and a look up table constituting an output profile that describes this mapping. As shown in FIG. 5A, for example, the Adobe RGB color space serving as the color space of the input device is represented as a color gamut 300 in the standard color space 301 of a CIE-L*a*b* color space. The color space of the printer (the image output device 507) serving as the output device is represented as a color gamut 302 in the standard color space 301. The individual grid points of the look up table include colors in the color gamut 300 of the input device and are defined as colors (designated by black points) in the standard color space 301, as shown in FIG. 5B. In the individual grid points, colors to which the colors of the grid points are mapped are specified as grid point data. Specifically, this grid point data is represented, as colors in the color gamut 302 of the output device, to which the colors of the grid points are mapped, by data of a device RGB value corresponding to a L*a*b* value in the standard color space. The profile or the generation method thereof according to the present embodiment relates to an output profile in the above-described example where, in the standard color space 301, the color gamut 300 of the input device is mapped to the color gamut 302 of the output device.

Figure 6:
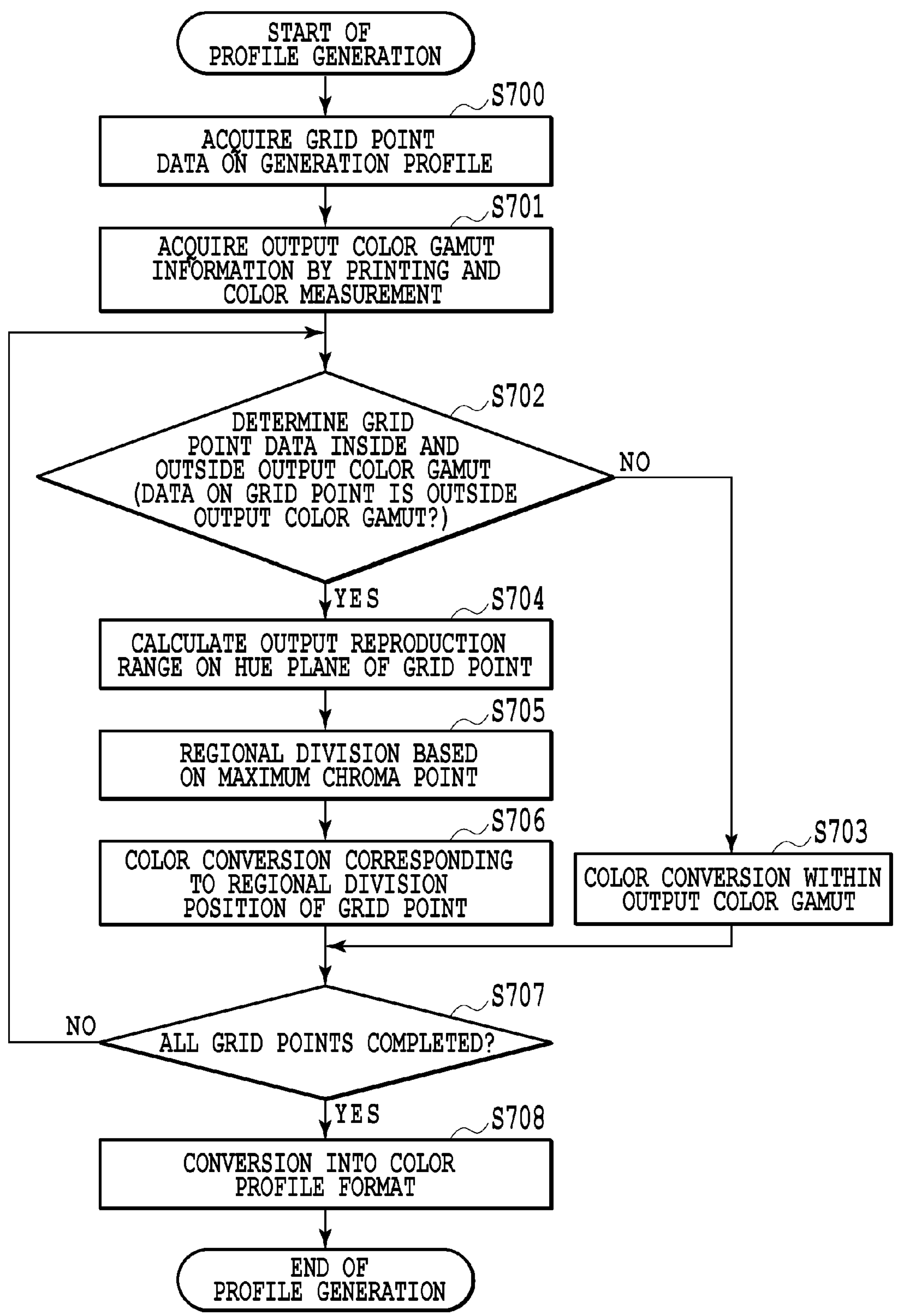
FIG. 6 is a flowchart showing processing for generating a color profile in the embodiment of the present invention.
Figure 7:
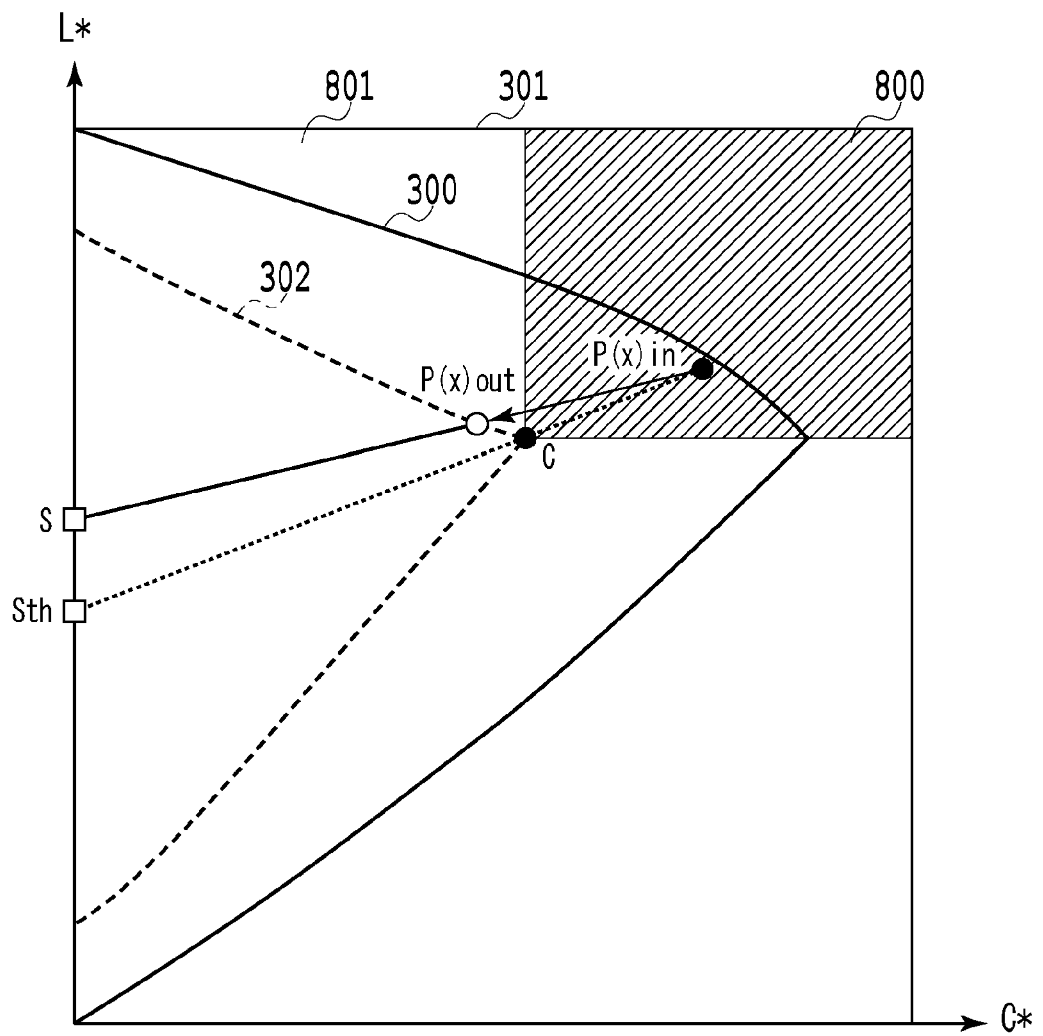
FIG. 7 is a schematic diagram illustrating a method of performing gamut mapping that is described in the present embodiment.

FIG. 6 is a flowchart showing processing for generating a color profile. FIG. 7 is a schematic diagram illustrating a gamut mapping method which will be described in the present embodiment.

In FIG. 6, first in step S700, information on the grid data of an output profile to be generated is set. In the following description, as shown in FIG. 5B, an example where the output profile is set to have 729 grid points with nine points in each axis will be discussed. Specifically, the grid points with nine points in each axis are set through the operation portion 503 and the monitor 505 (FIG. 3). By this setting instruction, the number of grid points specified in the CIE-L*a*b* color space is 729 (9×9×9); in the following description, the L*a*b* value of these grid points is assumed to be L_in(i), a_in(j) and b_in (k) (where i, j and k are any of 0 to 8).

Then, in step S701, based on patch chart image data that is previously stored, a patch chart is printed by the image output device 507 which is the output device, and the color of the printed patches are measured and thus information on the output color gamut of the image output device is acquired. In the present embodiment, the grid points with nine points in each axis are present and consideration is given to interpolation processing on data which will be described later. Thus, in order for the colorimetric value of the intermediate color to be acquired, the patches of 4913 colors (=17×17×17) with 17 points in each axis obtained by dividing each axis on the RGB color space into 16 parts are printed. Then, the measurement data (L*a*b* value) obtained by the colorimetric portion 509 is stored in the information storage portion 508.

In the specific patch chart print operation, the patch chart image data is input to the image data I/F portion 601 shown in FIG. 4. Here, in order for information on the output color reproduction region of the image output device 507 to be acquired, the input space conversion processing portion 602 and the output space conversion processing portion 605 do not perform the respective processing, and the RGB signal is input as it is to the color material color development processing portion 608. The color material color development processing portion 608 uses parameters for a target sheet which are set by the print information DB 613 and the color material coefficient conversion portion 609 to develop the RGB signal into image data on color component signals corresponding to the inks of six colors that are cyan, light cyan, magenta, light magenta, yellow and black. Then, based on the processing by the print information DB 613 and a print coefficient conversion portion 612, binary data is obtained by the half-toning processing portion 610, and printing is performed through the print control portion 611.

The information storage portion 508 converts the measurement value obtained as described above into the following two pieces of output color gamut information and stores them. First output color gamut information is information to which the RGB value, which is reproduced as a color (color having the smallest color difference) closest to the L*a*b* value which is the measurement value, is made to correspond. Specifically, the measurement value is obtained as a Lab value by measuring the color of the patch printed based on the RGB value, and this value is converted by known inverse conversion and interpolation processing into the RGB value and is stored. Second output color gamut information is likewise stored based on the measurement value as output color gamut information for determining the range of the output color gamut. Specifically, based on the measurement value, an a*b* value that is the boundary of the color gamut for each L* value within the range of 0 to 100 is determined, and it is stored as the second output color gamut information. In other words, the second output color gamut information indicates the boundary of the color gamut that the image output device printing the patch can reproduce. Needless to say, although the example where the first information and the second information are separately stored has been described, these two pieces of information may be stored as one piece of storage information.

In step S702, whether or not the L*a*b* value of the grid point that is the object to be processed is present within the color gamut 302 of the output device obtained as described above is determined. This determination is performed by sequentially incrementing i, j and k with respect to the 729 grid points set in step S700 (S707). More specifically, when the grid point that is the object to be processed is assumed to be i=x, j=y and k=z, whether L_in(x), a_in(y) and b_in(z) is present within or out of the range of the color gamut 302 is determined based on the second output color gamut information stored in step S701. If the grid point is present within the range (including the boundary) of the color gamut 302, the process proceeds to step S703 whereas, if the grid point is present out of the range of the color gamut 302, the process proceeds to step S704.

In step S703, color conversion is performed when the grid point is present within the color gamut 302 of the output device. In the present embodiment, grid point data in which the color of the grid point is mapped without being processed, that is, the parameter of the output profile, is determined. Specifically, based on the first output color gamut information obtained in step S701, the device RGB value corresponding to L_in(x), a_in(y) and b_in(z) is set at the grid point data on the grid point, that is, the parameter of the output profile, such that the color of the grid point L_in(x), a_in(y) and b_in(z) becomes the color itself.

On the other hand, in step S704, an output color reproduction region (the color gamut 302 in FIG. 7) on the plane (the plane as shown in FIG. 7) of a hue of the color of the grid point that is the object to be processed is calculated. Specifically, based on the a*b* value for the L*value in the second output color gamut information stored in step S701, the boundary of the color gamut 302 of the output device shown in FIG. 7 is computed and determined. In FIG. 7, P(x) in is the grid point that is the object to be processed.

Then, in step S705, the regional division for the grid point is performed in order to determine to which of two regions described below the grid point that is the object to be processed belongs based on the maximum chroma point of the color gamut 302 on the hue plane of the grid point that is the object to be processed. More specifically, the maximum chroma point of the color gamut 302 is set at C, a region that has a lightness value higher than the lightness value at the C point and that has a chroma higher than the chroma at the C point is set as the first division region 800 and the region other than the first division region are set as the second division region 801.

Then, in step S706, the method of gamut compression is switched to perform mapping according to which one of the first division region 800 and the second division region 801 divided in step S705 the grid point that is the object to be processed belongs to.

When the object grid point is present within the first division region 800, the mapping is performed as follows. As shown in FIG. 7, the intersection point Sth of a straight line connecting the grid point P(x) in that is the object to be processed to the maximum chroma point C and an achromatic axis (lightness axis) is calculated, and a point S that has a lightness equal to or higher than the lightness at the intersection point Sth on the achromatic axis is set as a focal color. In the present embodiment, the point on the achromatic axis is preferably a point in which a* and b* are zero, and the L* value is not limited to be a point within the range of 0 to 100. Hence, the values of the intersection point Sth on the achromatic axis and the lightness (L*) of the focal color S may be relatively large values or may be negative values. However, the focal color S is set such that a line connecting the grid point P(x)in and the focal color S intersect the boundary of the output color gamut. Since, as described above, the intersection point Sth is specified by the line connecting the grid point P(x)in that is the object to be processed to the maximum chroma point C, the intersection point Sth differs on an individual grid point basis.

Figure 8:
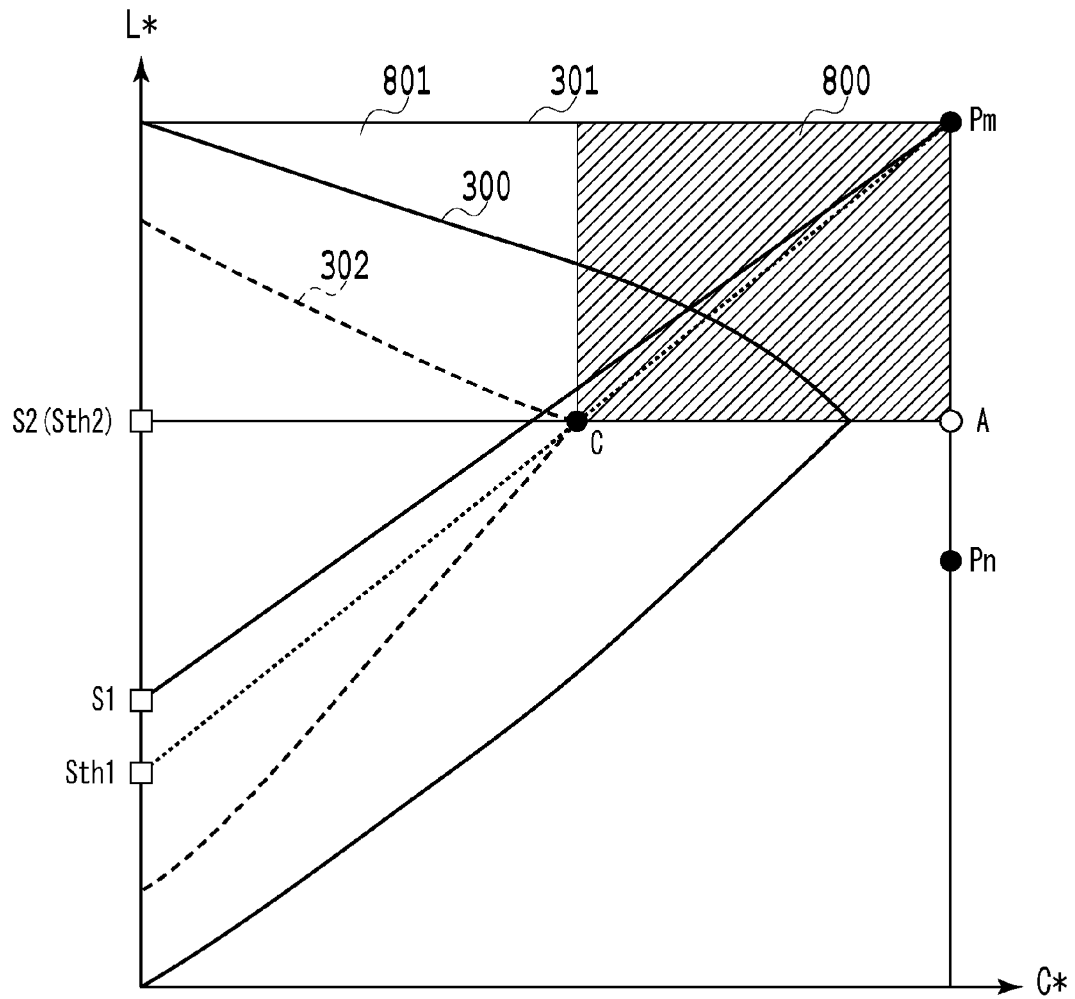
FIG. 8 is a diagram illustrating the setting of a focal color that is described in the present embodiment.

In the present embodiment, the grid points having an same lightness have the same focal color. Hence, preferably, the intersection point Sth is calculated for the grid point having the same lightness and the maximum chroma, the focal color S is determined and the focal color is applied to the grid point having the same hue and a same lightness. Therefore, the lightness L(S) of the focal color S for the grid point that is the object to be processed within the region 800 in the present embodiment is calculated with formula (2) below, based on the lightness L (S1) of the focal color corresponding to the grid point Pm having the maximum lightness and chroma within the region 800 and the lightness L (S2) of the focal color for a point A that has the chroma same as the point Pm, as shown in FIG. 8. In formula (2), L(x) is the lightness of the grid point that is the object to be processed. L_rmax is the maximum lightness for the region 800; L_rmin is the lightness at the maximum chroma point C. A point Sth1 shown in FIG. 8 is the intersection point of a straight line connecting the grid point Pm to the maximum chroma point C and the achromatic axis. In the present embodiment, the focal colors corresponding to the grid point Pm and the point A are assumed to be S1 and S2 (equal to Sth2), respectively, of FIG. 8.

$$L(S)=(L(S1)-L(S2))\cdot(L(x)-L\_r\min)/(L\_r\max-L\_r\min)+L(S2)\ (L(S1)<L(S2)) \quad (2)$$

Then, L_out(x), a_out(y) and b_out(z) that is the L*a*b* value of the intersection point P(x) out (the intersection on the above-mentioned straight line) of a straight line connecting the grid point P(x) in that is the object to be processed and the focal color S and the boundary of color gamut 302 is calculated. L_out(x), a_out(y) and b_out(z) that is the L*a*b* value of the intersection point P(x)out becomes an output color corresponding to the grid point P(x)in.

On the other hand, when the object grid point is present within the second division region 801, mapping using the focal color that is set by a known method is performed, and the output color L_out(x), a_out(y) and b_out(z) in the boundary of the color gamut 302 is determined. In the present embodiment, the focal color for the grid point within the second division region 801 is calculated with formula (1) described above. As a known mapping method, a mapping method in which lightness emphasis or chroma emphasis is set by a plurality of focal colors corresponding to the lightness as in formula (1) may be used or a method using one focal color may be used. However, in the boundary between the region 800 and the region 801, the focal color of the region boundary is set such that the respective magnitude relationships of the lightness and the chroma in the input color space are held even in the output color space. In the present embodiment, a point having a lightness of Sth2 or higher is set at the focal color for the point A from the focal color of a grid point Pn that is present within the region 801 and that is the closest to the boundary (the lower end) with the region 800 such that the respective magnitude relationships of the lightness and the chroma in the color input color space are held even in the output color space.

For the output color determined as described above, based on the first output color gamut information determined in step S701, the device RGB value of the output color L_out(x), a_out(y) and b_out(z) is determined, and grid point data for the object grid point, that is, the parameter of the color profile, is determined.

In step S707, when it is determined that the processing for determining the parameter has been performed on all the grid points of the color profile, and then, in step S708, the parameter of the color profile determined as described above is converted into a format that can be utilized as the output profile 607 shown in FIG. 4.

The method of determining, in step S706, the focal color when the grid points belonging to the first division region 800 are mapped is not limited to the method described above. For example, the focal color may be set at Sth described above. Specifically, for each grid point that is the object to be processed, the intersection point Sth of the straight line connecting the grid point P(x)in to the maximum chroma point C and the achromatic axis (lightness axis) is calculated, and the L*a*b* value of the intersection point P(x)out of the straight line connecting the grid point P(x)in and the focal color Sth and the boundary of color gamut 302 may be set at the output color for the object grid point.

Figure 9:
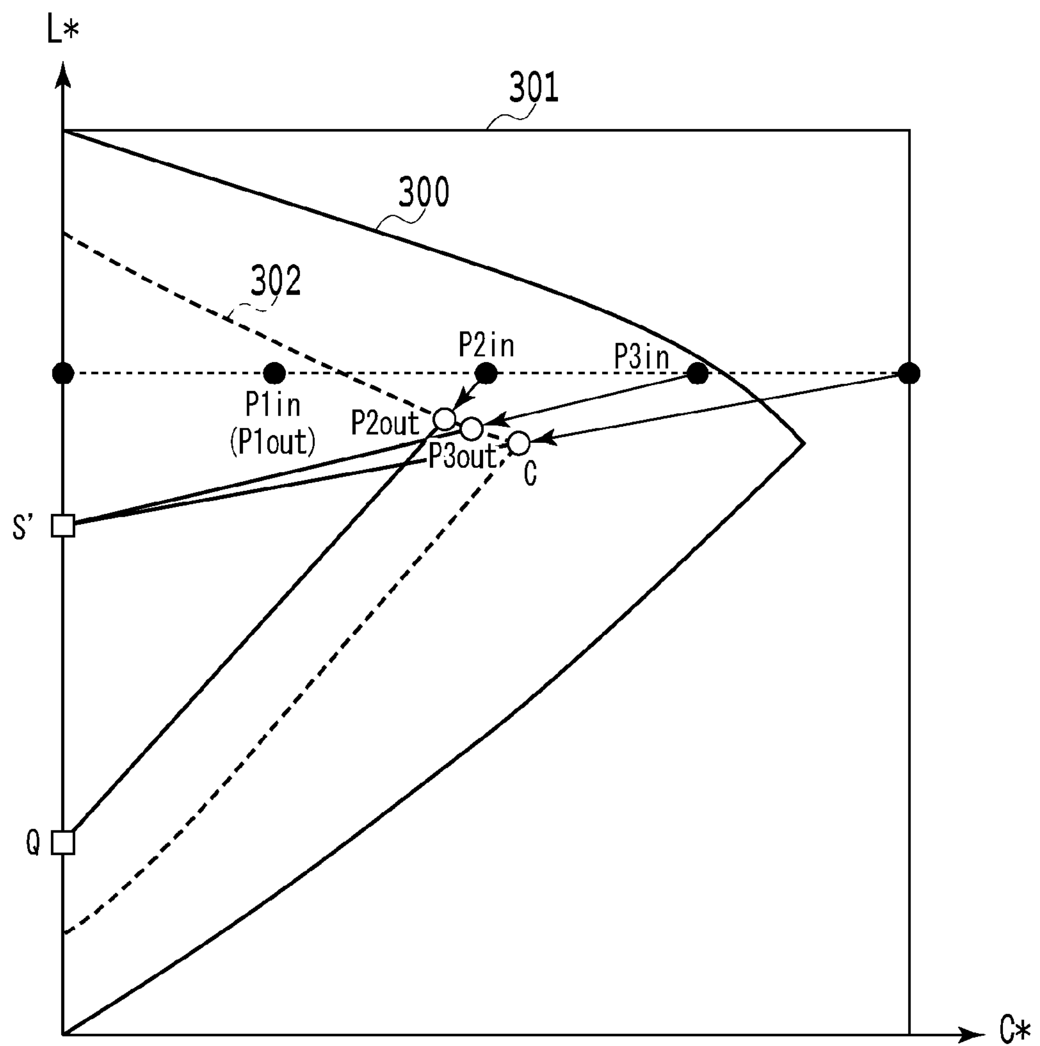
FIG. 9 is a diagram illustrating an example of the gamut mapping by the profile generated in the embodiment of the present invention.

According to the embodiments described above, as shown in FIG. 9, it is possible to prevent the chromaticity of P3out from greatly separating from a color P1out, which are respectively obtained by mapping colors having the same lightness. Thus, it is possible to prevent lightness jumping and perform satisfactory color reproduction regardless of the shape of the color gamut of the output device.

Other Embodiments

Although the embodiments described above relate to the method of mapping colors outside the color gamut of the output device on the surface (the outmost part) of the color gamut, the present invention is not limited to this form. For example, the present invention can be applied to a method of mapping the colors outside the color gamut of the output device to the outmost part of a predetermined color gamut specified within the color gamut of the output device. In this case, it is possible to perform the same mapping as in the embodiments described above with reference to the maximum chroma point in the predetermined color gamut specified therewithin.

Although, in the present embodiment, since the grid points having a same lightness have the same focal color, the focal color within the region 800 is calculated with formula (2), the present invention is not limited to this method. The focal color of the grid point within the region 800 has a lightness equal to or higher than the lightness of the intersection of the straight line connecting the grid point that is the object to be processed to the maximum chroma point of the output color gamut and the achromatic axis, and, as long as the respective magnitude relationships of the lightness and the chroma in the input color space are held even in the output color space, any setting may be performed. Although, in the method described above, the Adobe RGB color space is illustrated as the input color space, the color space is not limited to this. Another color space such as sRGB, Wide Gamut RGB or the like may be used. Although the CIE-L*a*b* color space is illustrated as the standard color space, the color space is not limited to this. Needless to say, a similar color space such as an XYZ color space or a J*C*H* color space can be used to achieve satisfactory effects. Although, in the present embodiment, the example of the colorimetric processing is described, perceptual or chroma emphasized (saturation) processing may be used. Although, in the present embodiment, the number of grid points of the generated LUT is 729, the number of grid points is not limited to this number. The number of slices that allows the representation of the output color gamut is preferably used.

Furthermore, the present invention can be achieved by performing the following processing. Specifically, software (program) that realizes the functions of the embodiments described above is supplied to a system or a device through a network or various types storage media, and the computer (or CPU, MPU or the like) of the system or the device reads and executes the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-020094, filed Feb. 1, 2011, which is hereby incorporated by reference herein in its entirety.

What is claimed is:

1. An image processing apparatus that generates a profile for, in a color space, converting a color of a grid point defined in a first color gamut into a color in a second color gamut by mapping the color of the grid point to a color on a straight line connecting the color of the grid point to a focal color on achromatic axis, said apparatus comprising:

a determining unit configured to determine whether or not the color of the grid point belongs to a predetermined region, a color in which has lightness higher than the lightness at a maximum chroma color in the second color gamut and has chroma higher than the chroma at the maximum chroma color in a plane of a hue of the color of the grid point in color space;

a converting unit configured to perform mapping the color of the grid point defined in the first color gamut; and a profile generation unit configured to generate the profile based on a result of the conversion of each of a plurality of the color of the grid point, wherein in the case that said determining unit determines that the color of the grid point belongs to the predetermined region, said converting unit sets, as the focal color, a color having lightness equal to or higher than lightness at an intersection point of an achromatic axis and straight line connecting a point of the color of the grid point to a point of the maximum chroma color, and performs the mapping of the color of the grid point.

2. The image processing apparatus according to claim 1, further comprising a converter that converts image data in the first color gamut into image data in the second color gamut, by using the generated profile.

3. The image processing apparatus as claimed in claim 1, wherein the color space is L*a*b* color space.

4. The image processing apparatus as claimed in claim 1, wherein the first color gamut corresponds to a color gamut by an input device, and the second color gamut correspond to a color gamut by an output device.

5. The image processing apparatus as claim 1, wherein the first color gamut corresponds to a color gamut by a digital camera or to a color gamut by an image scanner and the second color gamut corresponds to a color gamut by a printer.

6. The image processing apparatus as claim 1, wherein the first color gamut contains the second color gamut.

7. A profile generation method for generating a profile for, in a color space, converting a color of a grid point defined in a first color gamut into a color in a second color gamut by mapping the color of the grid point to a color on a straight line connecting the color of the grid point to a focal color on achromatic axis, said method comprising:

a determining step of determining whether or not the color of the grid point belongs to a predetermined region, a color in which has lightness higher than the lightness at a maximum chroma color in the second color gamut and has chroma higher than the chroma at the maximum chroma color in a plane of a hue of the color of the grid point in the color space;

a converting step of performing mapping the color of the grid point defined in the first color gamut; and a profile generation step of generating the profile based on a result of the conversion of each of a plurality of the color of the grid point, wherein in the case that said determining step determines that the color of the grid point belongs to the predetermined region, said converting step sets, as the focal color, a color having lightness equal to or higher than lightness at an intersection point of an achromatic axis and a straight line connecting a point of the color of the grid point to a point of the maximum chroma color, and performs the mapping of the color of the grid point.

8. The method according to claim 7, further comprising converting image data in the first color gamut into image data in the second color gamut, by using the generated profile.

9. A non-transitory computer-readable storage medium storing computer-executable code of a program that is read by a computer to cause the computer to function as an image processing apparatus for generating a profile for, in a color space, converting a color of a grid point defined in a first color gamut into a color in a second color gamut by mapping the color of the grid point to a color on a straight line connecting the color of the grid point to a focal color on achromatic axis, said program comprising:

code of a determining step of determining whether or not the color of the grid point belongs to a predetermined region, a color in which has lightness higher than the lightness at a maximum chroma color in the second color gamut and has chroma higher than the chroma at the maximum chroma color in a plane of a hue of the color of the grid point in the color space;

code of a converting step of performing mapping the color of the grid point defined in the first color gamut; and code of a profile generation step of generating the profile based on a result of the conversion of each of a plurality of the color of the grid point, wherein in the case that said determining step determines that the color of the grid point belongs to the predetermined region, said converting step sets, as the focal color, a color having lightness equal to or higher than lightness at an intersection point of an achromatic axis and a straight line connecting a point of the color of the grid point to a point of the maximum chroma color, and performs the mapping of the color of the grid point.

10. The non-transitory computer-readable storage medium according to claim 9, further comprising code for converting image data in the first color gamut into image data in the second color gamut, by using the generated profile.

11. A profile generation method for generating a profile for converting a color signal of a first color space to a color signal of a second color space, said method comprising:

a step of, on a plane that is contained in a predetermined color space and contains an achromatic axis and an object color indicating a color signal of the first color space, setting a focal color on the achromatic axis, the focal color corresponding to the object color, wherein a chroma of the object color is higher than a chroma of a maximum chroma point of a gamut in the second color space, and a lightness of the object color is higher than a lightness of the maximum chroma point, wherein a lightness of the set focal color is equal to or higher than a lightness of an intersection point between a line connecting the maximum chroma point to the object color and the achromatic axix, and wherein a lightness of the focal color corresponding to the object color which has a first lightness is different from a lightness of the focal color corresponding to the object color which has a second lightness different from the first lightness; and a step of relating the predetermined color signal of the first color space which corresponds to the object color to a color signal of the second color space which is contained in the gamut of the second color space and corresponds to a point on a line connecting the object color to the focal color.

12. The profile generation method according to claim 11, wherein the predetermined color space is an L*a*b* color space.

13. The profile generation method according to claim 11, wherein the first color space is a color space defined by a R, G, B coordinate system.

14. The profile generation method according to claim 11, wherein colors having same lightness in a region, a color in which having lightness higher than the lightness as a maximum chroma color in the second color space and having chroma higher than the chroma at the maximum chroma, correspond to a same focal color.

* * * * *